(12) United States Patent
Deng

(10) Patent No.: US 9,294,011 B2
(45) Date of Patent: Mar. 22, 2016

(54) METHOD AND APPARATUS FOR SENSING UNDERWATER SIGNALS

(75) Inventor: Ken Kan Deng, Gaithersburg, MD (US)

(73) Assignee: ION Geophysical Corporation, Houston, TX (US)

( * ) Notice: Subject to any disclaimer, the term of this patent is extended or adjusted under 35 U.S.C. 154(b) by 191 days.

(21) Appl. No.: 13/984,255

(22) PCT Filed: Feb. 7, 2012

(86) PCT No.: PCT/US2012/024165
§ 371 (c)(1),
(2), (4) Date: Aug. 7, 2013

(87) PCT Pub. No.: WO2012/109259
PCT Pub. Date: Aug. 16, 2012

(65) Prior Publication Data
US 2013/0312522 A1    Nov. 28, 2013

Related U.S. Application Data

(60) Provisional application No. 61/462,617, filed on Feb. 7, 2011, provisional application No. 61/462,656, filed on Feb. 7, 2011.

(51) Int. Cl.
*G01P 15/12* (2006.01)
*H02N 1/00* (2006.01)
(Continued)

(52) U.S. Cl.
CPC ............... *H02N 1/006* (2013.01); *G01H 11/08* (2013.01); *G01P 15/09* (2013.01); *G01P 15/0915* (2013.01); *G01P 15/123* (2013.01);
(Continued)

(58) Field of Classification Search
CPC . G01P 15/123; G01P 15/0802; G01P 15/125; A63B 2220/40
USPC ............... 73/514.33, 514.34, 514.36, 514.16, 73/514.01, 488
See application file for complete search history.

(56) References Cited

U.S. PATENT DOCUMENTS 4,075,525 A   2/1978   Birchall
4,327,350 A   4/1982   Erichsen
(Continued)

FOREIGN PATENT DOCUMENTS

CN   101038298 A   9/2007
CN   101426163     5/2009
(Continued)

OTHER PUBLICATIONS

TDK Corp, Piezoelectric Actuator, JP10-13665.*
(Continued)

*Primary Examiner* — Lisa Caputo
*Assistant Examiner* — Nigel Plumb
(74) *Attorney, Agent, or Firm* — Dorsey and Whitney LLP

(57) ABSTRACT

Methods and apparatuses are disclosed that assist in sensing underwater signals in connection with geophysical surveys. One embodiment relates to a transducer including a cantilever coupled to a base. The cantilever may include a beam and a first coupling surface angularly oriented from the beam, and the base may include a second coupling surface angularly oriented from the beam and substantially parallel to the first coupling surface of the cantilever. The transducer may further include a sensing material coupled between the first coupling surface of the cantilever and the second coupling surface of the base.

17 Claims, 8 Drawing Sheets

(51) Int. Cl.

| | |
|---|---|
| *G01H 11/08* | (2006.01) |
| *G01P 15/09* | (2006.01) |
| *G01P 15/18* | (2013.01) |
| *G01V 1/18* | (2006.01) |
| *G01V 13/00* | (2006.01) |
| *G01V 1/38* | (2006.01) |
| *G01P 15/08* | (2006.01) |

(52) U.S. Cl.
CPC ................ *G01P 15/18* (2013.01); *G01V 1/18* (2013.01); *G01V 13/00* (2013.01); *G01P 2015/0805* (2013.01); *G01P 2015/0828* (2013.01); *G01V 1/38* (2013.01); *Y10T 29/49005* (2015.01)

(56) References Cited

U.S. PATENT DOCUMENTS

| | | | |
|---|---|---|---|
| 4,908,921 A | 3/1990 | Chen et al. | |
| 4,930,042 A | 5/1990 | Wiegand et al. | |
| 5,000,817 A | 3/1991 | Aine | |
| 5,121,180 A | 6/1992 | Beringhause et al. | |
| 5,335,544 A * | 8/1994 | Wagner | G01P 15/0802 73/514.32 |
| 5,383,364 A | 1/1995 | Takahashi et al. | |
| 5,406,531 A | 4/1995 | Henriquez et al. | |
| 5,484,073 A | 1/1996 | Erickson | |
| 5,616,844 A | 4/1997 | Suzuki et al. | |
| 5,777,226 A * | 7/1998 | Ip | G01P 15/02 73/514.24 |
| 6,026,690 A | 2/2000 | Nakagawa et al. | |
| 6,082,197 A * | 7/2000 | Mizuno | G01P 15/0802 73/514.32 |
| 6,105,427 A | 8/2000 | Stewart et al. | |
| 6,196,067 B1 | 3/2001 | Martin et al. | |
| 6,263,735 B1 | 7/2001 | Nakatani et al. | |
| 6,715,363 B1 | 4/2004 | Deng et al. | |
| 6,805,008 B2 | 10/2004 | Selvakumar et al. | |
| 6,861,587 B1 | 3/2005 | Selvakumar et al. | |
| 6,871,554 B2 | 3/2005 | Duret et al. | |
| 6,883,638 B1 * | 4/2005 | Maxwell | G01D 11/245 181/102 |
| 6,945,110 B2 | 9/2005 | Selvakumar et al. | |
| 6,981,416 B2 | 1/2006 | Chen et al. | |
| 7,066,026 B2 | 6/2006 | Deng | |
| 7,104,140 B2 | 9/2006 | Zou et al. | |
| 7,137,300 B2 | 11/2006 | Aoyagi et al. | |
| 7,152,473 B1 | 12/2006 | Rushefsky et al. | |
| 7,236,279 B2 | 6/2007 | Yu et al. | |
| 7,274,079 B2 | 9/2007 | Selvakumar et al. | |
| 8,544,325 B2 | 10/2013 | Ackerley et al. | |
| 2002/0178817 A1 * | 12/2002 | Selvakumar | G01P 15/0802 73/514.32 |
| 2003/0020377 A1 | 1/2003 | Namerikawa et al. | |
| 2004/0020292 A1 | 2/2004 | Deng | |
| 2005/0056096 A1 * | 3/2005 | Ozawa | G01P 15/0802 73/514.36 |
| 2005/0057123 A1 | 3/2005 | Deng | |
| 2005/0134149 A1 | 6/2005 | Deng et al. | |
| 2005/0248235 A1 * | 11/2005 | Namerikawa | H01L 41/0831 310/328 |
| 2007/0107521 A1 | 5/2007 | Yasuda et al. | |
| 2007/0119259 A1 * | 5/2007 | Zou | G01P 15/0922 73/777 |
| 2008/0184787 A1 | 8/2008 | Coates | |
| 2011/0033062 A1 | 2/2011 | Deng | |

FOREIGN PATENT DOCUMENTS

| | | |
|---|---|---|
| CN | 101475138 | 7/2009 |
| CN | 101858929 A | 10/2010 |
| DE | 10260087 A1 | 7/2004 |
| EP | 1348967 | 10/2003 |
| EP | 1953499 A2 | 8/2008 |
| GB | 2174500 A | 11/1986 |
| GB | 2444373 A | 6/2008 |
| JP | 10-136665 A | 5/1998 |
| JP | 2000275272 A | 10/2000 |
| JP | 2008-107257 | 5/2008 |
| RU | 1647409 A1 | 1/1989 |
| WO | 8702467 | 4/1987 |
| WO | 8900294 | 1/1989 |
| WO | 9100522 | 1/1991 |
| WO | 2007095360 A2 | 8/2007 |
| WO | 2012/109259 | 8/2012 |
| WO | 2012109266 A2 | 8/2012 |

OTHER PUBLICATIONS

TDK Corp, JP 10-13665 , May 22, 1998.*
A Bakker, et al, "A CMOS Nested-Chopper Instrumentation Amplifier with 100nV Offset", IEEE Journal Solid-State Circuits, vol. 35, No. 12, Dec. 2000.
J. Wu, et al, "A Low-Noise Low-Offset Capacitive Sensing Amplifier for a 50 ug/rt Hz Monolithic CMOS MEMS Accelerometer", IEEE Journal Solid-State Circuits, vol. 39, No. 5, May 2004.
M. Trindade et al, "On high order modeling of smart beams with embedded shear-mode piezoceramic actuators and sensors", Mechanics of Advanced Materials and Structures, 13(5), pp. 357-369, 2006.
H Sun, et al, "A Low-Power Low-Noise Dual-Chopper Amplifier for Capacitive CMOS-MEMS Accelerometers", IEEE Sensors Journal, vol. 11, No. 4, Apr. 2011.
EoPlex Technologies, "Miniature Low Cost Ceramic, Metal and Polymer Parts", http://www.eoplex.com, date unknown.
International Search Report and Written Opinion, PCT/US2012/024173, Apr. 2013, 20 pages.
International Search Report and Written Opinion, PCT/US2012/024165, Apr. 2013, 19 pages.
Denmark Patent and Trademark Office Search Report for Patent App. No. PA 201370430, completed Feb. 4, 2014.
"First Technical Examination Report", issued in Danish Application No. PA 2015 70277 on Jun. 29, 2015, 7 pages.
"Search Report issued Jul. 23, 2015, in Chinese Application No. 201280016682.4", 3 pages.
"Search Report issued Oct. 29, 2015, in Chinese Application No. 201280016638.3, 2 pages".

* cited by examiner

METHOD AND APPARATUS FOR SENSING UNDERWATER SIGNALS

This application claims priority to PCT application No. PCT/US2012/024165 entitled "METHOD AND APPARATUS FOR SENSING UNDERWATER SIGNALS" filed on Feb. 7, 2012, and also to U.S. provisional application No. 61/462,617 entitled "An Underwater Vector Sensor by Using Batch Fabricated Precision Capacitive Accelerometer" filed on Feb. 7, 2011, and also to U.S. provisional application No. 61/462,656 entitled "Underwater Vector Sensor by Using Piezoelectric Flexible Shear Mode Sensor" also filed on Feb. 7, 2011, all of which are incorporated herein by reference in their respective entireties.

TECHNICAL FIELD

This disclosure relates generally to transducers, and more particularly to transducers for use in sensing underwater signals such as acoustic signals.

BACKGROUND

Petrochemical products such as oil and gas are ubiquitous in society and can be found in everything from gasoline to children's toys. Because of this, the demand for oil and gas remains high. In order to meet this high demand, it is important to locate oil and gas reserves in the Earth. Scientists and engineers conduct "surveys" utilizing, among other things, seismic and other wave exploration techniques to find oil and gas reservoirs within the Earth. These seismic exploration techniques often include controlling the emission of seismic energy into the Earth with a seismic source of energy (e.g., dynamite, air guns, vibrators, etc.), and monitoring the Earth's response to the seismic source with one or more receivers (which may each include one or more transducers used as sensors, for example, an accelerometer, a hydrophone, etc.). By observing the reflected seismic signals detected by the receiver during the survey, the geophysical data pertaining to reflected signals may be acquired and these signals may be used to form an image indicating the composition of the Earth near the survey location.

Conventional receivers may include one or more transducers used as accelerometers to measure vibrations, particle motion, acceleration, and so forth. For example, a 3-dimensional receiver may include three orthogonally oriented transducers. Each transducer may include a flexible cantilever beam and one or more piezoelectric elements bonded to the beam, as well as a proof mass attached to one end of the beam. When forces are exerted on the proof mass, the proof mass and the attached cantilever beam are deflected, causing stress of the piezoelectric elements. This stress of the piezoelectric elements results in a measurable change in the electric charge or voltage generated by the piezoelectric material forming the elements, which can be measured to determine the direction and magnitude of the deflection of the proof mass. The typical voltage output may be from several mV to hundreds of mV.

Conventional transducer designs often utilize piezoelectric material that is best suited for sensing normal stress imparted onto the piezoelectric material. Such material is well-suited to detecting some signals, but may be less efficient at detecting other signals, such as low-level signals which may be desirable to detect during seismic imaging. Accordingly, transducers that allow for detection of low-level signals (e.g., low frequency signals) that overcome one or more of the limitations of conventional approaches are desired.

SUMMARY

The present disclosure is directed to an apparatus and method for sensing signals, and has particular application for sensing underwater acoustic and vibration signals.

In one embodiment, the present disclosure relates to a transducer including a cantilever coupled to a base. The cantilever may include a beam and a first coupling surface angularly oriented from the beam, and the base may include a second coupling surface angularly oriented from the beam and substantially parallel to the first coupling surface of the cantilever. The transducer may further include a sensing material coupled between the first coupling surface of the cantilever and the second coupling surface of the base.

In some embodiments, the first coupling surface of the cantilever may be obtusely oriented from the beam. In other embodiments, the first coupling surface of the cantilever may be acutely oriented from the beam. In another embodiment, the sensing material may include first and second surfaces and the sensing material may be configured to operate in a shear mode.

In a further embodiment, the surface of the sensing material may be in contact with the first coupling surface of the cantilever and the second surface of the sensing material may be in contact with the second coupling surface of the base. In another embodiment, the sensing material may have a rectangular cross-section. In one embodiment, the transducer may include a tine that couples the cantilever to the base. In a further embodiment, the tine may be configured to reduce the cross-axis sensitivity of the transducer and to enhance shear stress applied to the sensing material. In some embodiments, the cantilever may define the tine and the tine may extend into a void in the base. In another embodiment, the base may define the tine and the tine may extend into a void in the cantilever.

In another embodiment, the transducer may further include a proof mass. In some embodiments, the proof mass may be a distinct form, but coupled to the beam. In other embodiments, the proof mass may be integral with the beam. In a further embodiment, the sensing material may include a piezoelectric element. However, in other embodiments, the sensing material may include a piezoresistive element, or a different type of shear mode sensing material.

In some embodiments, the cantilever, the base and the sensing material may together form a first accelerometer, and the transducer may further include a second accelerometer and a third accelerometer, with the first, second, and third accelerometers mounted in a housing and together forming a vector sensor.

Another embodiment of the present disclosure may relate to a sensor including a cantilever coupled to a base. The cantilever may include a beam, and a sensing material may be embedded within the beam of the cantilever. The sensing material may include first and second surfaces that are angularly oriented from the beam.

In further embodiments, the sensing material may include a first piezoelectric element and a second piezoelectric element embedded within the beam. The second piezoelectric element may include third and fourth surfaces angularly oriented from the beam. In another embodiment, the third and fourth piezoelectric elements may be embedded within the beam. The third piezoelectric element may be oriented parallel to the first piezoelectric element and the fourth piezoelectric element oriented parallel to the second piezoelectric element. In another embodiment, the sensing material may include a piezoelectric shear mode element. In a further embodiment, the sensing material may have a parallelogram cross-section.

In a further embodiment, the cantilever may be coupled to the base at a first end of the cantilever and may include a proof mass coupled to a second end of the cantilever. Additionally, the cantilever may be coupled to the base at a first end of the cantilever and the sensing material may be embedded in the cantilever near the first end of the cantilever. In another embodiment, the beam may define a groove having a first inner wall, a second inner wall, and a third inner wall, where the third inner wall is substantially parallel to the first inner wall, and the sensing material is embedded within the groove. In another embodiment, the sensing material may be bonding the first and third inner walls, but not the second inner wall.

Another embodiment of the present disclosure may relate to a method. The method may include the acts of acquiring data from a transducer coupled to a body. The transducer may include a cantilever coupled to a base and including a beam defining at least one coupling surface. The transducer may further include at least one sensing element coupled to the at least one coupling surface. The sensing element may be a shear mode piezoelectric element. Some embodiments of the method may further include processing the data from the transducer to determine acoustic acceleration of the body in at least one directional component.

Another embodiment of the present disclosure may relate to another method. The method may include the acts of acquiring data from a transducer coupled to a body. The transducer may include a cantilever coupled to a base and including a beam defining at least one coupling surface that is angularly oriented with respect to a longitudinal axis of the beam. The vector sensor may further include at least one sensing element coupled to the at least one coupling surface. The sensing element may be subjected to shear stress as the beam is deflected relative to the base. In some embodiments, the method may further include the act of processing the data from the transducer to determine acoustic acceleration of the body in at least one directional component.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

DETAILED DESCRIPTION

Scientists and engineers conduct "surveys" utilizing, among other things, seismic and other wave exploration techniques to find oil and gas reservoirs within the Earth. These seismic exploration techniques often include controlling the emission of seismic energy into the Earth with a seismic source of energy (e.g., dynamite, air guns, vibrators, etc.), and monitoring the Earth's response to the seismic source with one or more receivers. By observing the reflected seismic signals detected by the receiver during the survey, the geophysical data pertaining to reflected signals may be acquired and these signals may be used to form an image indicating the composition of the Earth near the survey location.

Figure 1:
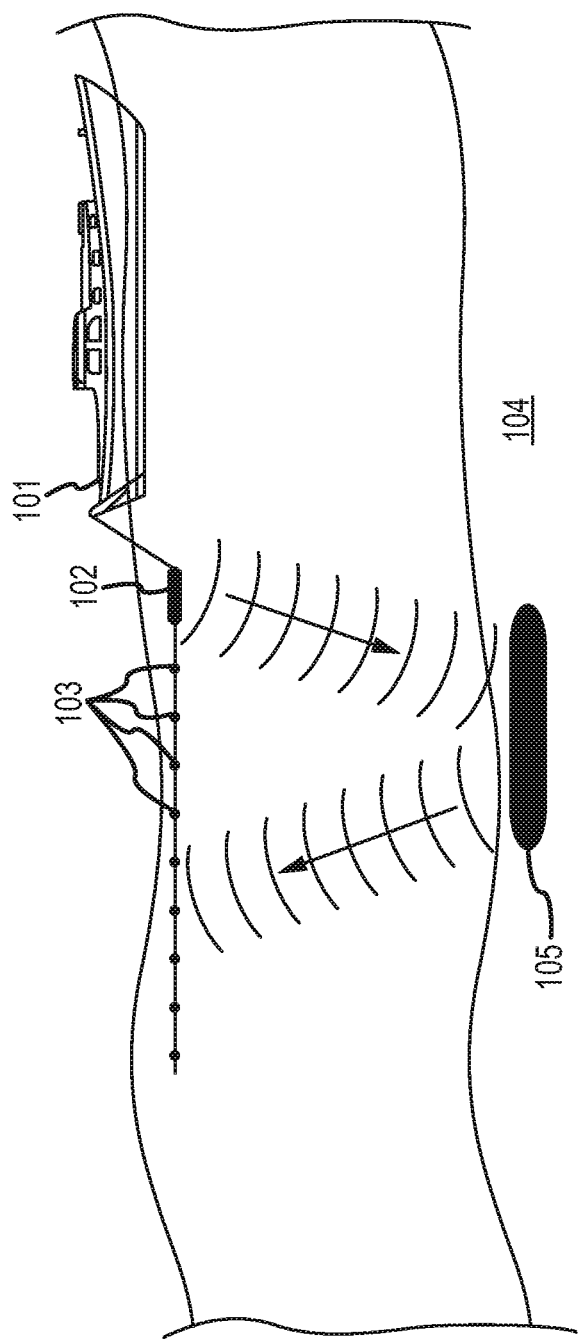
FIG. 1 illustrates a side view of a vessel towing a seismic source and a plurality of seismic receivers positioned on streamers towed behind the vessel.

FIG. 1 shows a side view of a vessel 101 towing a source 102 and several receivers 103 on streamers behind the vessel 101. As is shown, the receivers 103 may be positioned just beneath the surface of the water. For the sake of discussion, the embodiment depicted in FIG. 1 illustrates the source and receiver being towed by the same vessel, however other combinations are possible. For example, in other embodiments, either the source and/or receivers may be towed by separate vessels or may be implemented in land-based acquisition systems. In still other embodiments, the source and/or receivers may be stationary while the other is towed behind the vessel. In yet other embodiments, the receivers 103 may be positioned deeper in the water, for example, by using streamer steering devices, such as the DigiBIRD® and DigiFIN® brand steering devices available from ION Geophysical Corporation. In other embodiments, multiple sources may be used. Also, any type of source(s) or receiver(s) may be used, including for example, 1-, 2-, or 3-dimensional sources or receivers.

During operation, the source 102 may emit seismic energy (e.g., by an air gun), which may reflect off various portions of the Earth 104 and may be received back at the receivers 103 (as shown by the propagating seismic waves in FIG. 1). As will further be described below, each receiver 103 may include one or more transducers (not specifically shown in FIG. 1) used as accelerometers to measure the magnitude and direction of the reflected seismic energy. The receivers may further include other sensors and/or transmitting devices, such as a pressure sensor or a microphone. The signal received and processed at the receivers 103 may provide data that is useful in determining the composition of various portions of the Earth 104 proximate the location where the signal was reflected, which may include an oil and/or gas reservoir 105. If the amount of oil and/or gas in the reservoir 105 is depleted over time, then subsequent surveys conducted in substantially the same location as the first survey may indicate various properties of this depletion such as: decreasing pore pressures, migration of oil/water and/or gas/water contacts, drop in acoustic impedance, and so forth.

Figure 2:
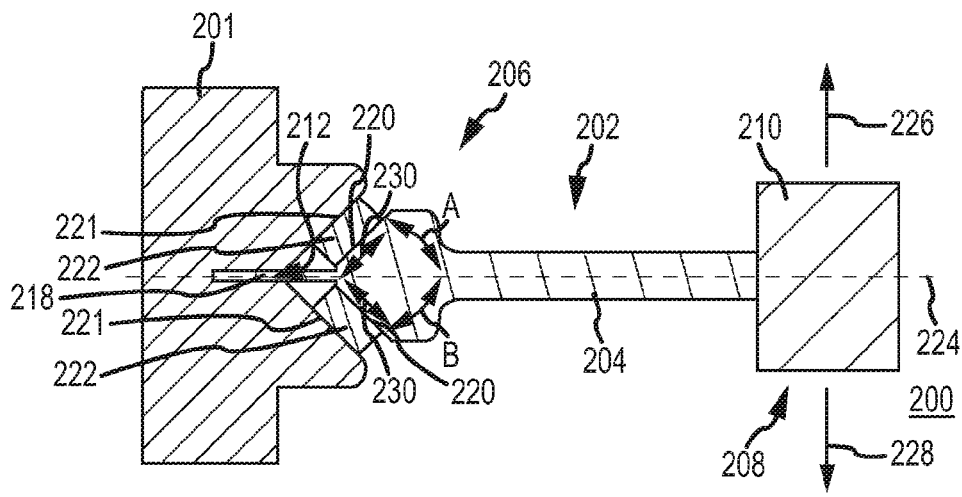
FIG. 2 illustrates a cross-sectional view of one embodiment of a transducer.

FIG. 2 illustrates one embodiment of a transducer 200 that may be used as a single-axis accelerometer (and which may be combined with other transducers 200 to form a tri-axial accelerometer or vector sensor in some embodiments). As is shown, the transducer 200 may include a cantilever 202 comprising a beam 204 defining a forward end 206 that is joined to a base structure 201 and a rear end 208 that is joined to a proof mass 210. In one embodiment, the forward end 206 of beam 204 may be anchored to the base structure 201 via a tongue 218 or a tine that is joined to the base structure 201. The tine or tongue 218 may serve to couple the beam 204 to the base structure 201, and may further serve to reduce the cross-axis sensitivity of the transducer 200 and/or improve output signals in sensing elements 222. The tine 218 may reduce the cross-axis sensitivity of the transducer 200 and/or improve output signals because the tine 218 may increase the bending stiffness of the cross-axis and provide a pivot point for the beam 204 during bending.

In one embodiment, the tongue 218 may be a strip of material that extends forwardly from the forward end 206 of the beam 204 into a receiving void or slot 212 defined by the base structure 201. In one embodiment, the forward end of the tongue 218 may be joined to the base structure 201 using an adhesive, such as an epoxy adhesive. In other embodiments, the tongue 218 may be otherwise joined to the base structure 201. For example, the tongue 218 may be keyed, and the base structure 201 may define a corresponding groove, such that mating the tongue 218 with the groove defined by the base structure 201 secures the tongue 218 to the base 201. In further embodiments, the base structure 201 and the beam 204 may be formed from a single piece of material. Alternatively, the tongue 218 may be integral to the base structure 201, and may extend into a slot or void in the cantilever 202.

In some embodiments, the beam 204 may be formed from a flexible material that allows the beam 204 to bend slightly as the proof mass 210 is displaced by external forces (e.g., from seismic energy, vibrations, and so on) relative to the base structure 201. The tongue 218 may be formed from the same material as the beam 204 (i.e., such that the beam 204 and the tongue 218 are formed from a single piece of material), or may be formed from a different material. In some embodiments, the tongue 218 may also bend slightly as the proof mass 210 is displaced by the external forces. As shown in FIG. 2, the tongue 218 may have a smaller thickness than the beam 204, or may have the same thickness as the beam 204. In some embodiments, the tongue may have sufficient thickness to support the weight of the proof mass 201 such that the beam 204 does not bend under the weight of the cantilever 202 alone (i.e., when no external forces are impacting upon the mass 210).

As is shown, the forward end 206 of the beam 204 may define two coupling surfaces 220 that are positioned on opposite sides of the beam 204. The coupling surfaces 220 may each be configured to receive one or more sensing elements 222 formed from a sensing material, such that at least a portion of the coupling surfaces 220 may contact at least a portion of one of the faces of the sensing elements 222. In one embodiment, the sensing elements 222 may be formed from a piezoelectric material, such as piezoelectric crystal. In other embodiments, the sensing elements 222 may be formed from another type of shear mode sensing material, such as piezoresistive material, piezoceramic material, piezo-composite material, piezoelectric crystals, and so forth.

The base structure 201 may also define two coupling surfaces 221 that are each configured to receive one or more sensing elements 222, such that at least a portion of the coupling surfaces 221 may contact at least a portion of one of the faces of the sensing elements 222. In some embodiments, the coupling surfaces 221 of the base structure 201 may contact the bottom faces of the sensing elements 222, and the coupling surfaces 220 of the beam 204 may contact the top faces of the sensing elements 222, or vice versa. The coupling surfaces 221, 220, may be bonded to the faces of the sensing elements 222 at the contact points between the coupling surfaces 211, 220 and the faces of the elements 222, such as by an adhesive. In some embodiments, the coupling surfaces 221 of the base structure 201 may be substantially parallel to the coupling surfaces 220 of the beam, as shown in FIG. 2. However, in other embodiments, the coupling surfaces of the base structure 201 may be non-parallel to the coupling surfaces 220 of the beam 204.

The coupling surfaces 220, 221 may each define angles A, B relative to the longitudinal axis 224 of the beam 204. In one embodiment, each coupling surface 220, 221 may define an acute angle with respect to the longitudinal axis 224 of the beam 204 (e.g., between 0 and 90 degrees). In one embodiment, the angles A, B defined between the coupling surfaces 220, 221 and the longitudinal axis 224 of the beam 204 may be substantially equal. However, in other embodiments, the coupling surfaces 220, 221 may define different angles relative to the longitudinal axis of the beam 204. For example, one of the coupling surfaces 220, 221 may define an angle A that is 45 degrees with respect to the longitudinal axis 224 of the beam 204, while the other of the coupling surfaces 220, 221 may define an angle B that is 65 degrees with respect to the longitudinal axis 224 of the beam 204. As is shown, the sensing elements 222 may each extend in a direction that is substantially non-perpendicular and non-parallel to the longitudinal axis of the beam 204, but which is substantially parallel to the coupling surfaces 220, 221.

In one embodiment, the sensing elements 222 may define a rectangular shape having six opposing faces. In some cases, rectangular-shaped sensing elements may be easier and less expensive to manufacture than some other configurations of sensing elements, which may result in a cost savings in manufacturing the transducer 200. In other embodiments, however, the sensing elements may be another configuration. For example, the sensing elements may define some other polyhedron shape, or may define one or more rounded edges. In one particular embodiment, the sensing elements may define a parallelepiped, in which the top and bottom faces of the sensing elements may be parallel to one another, and the end faces of the sensing elements may be parallel to one another. In such embodiments, the sensing elements may each have a parallelogram-shaped cross-section. In another embodiment, the sensing elements may define a prism shape.

As forces (represented by arrows 226 and 228) normal to the longitudinal axis of the beam are applied to the proof mass 210, the mass 210 may be displaced relative to the base structure 201. The beam 204 carries the load to the forward end 206, where the forces 226, 228 are converted to shear stress (represented by arrows 230) that is resisted by the sensing elements 222. In the embodiment shown in FIG. 2, the shear stress 230 may arise from force vector components that are substantially parallel to the coupling surfaces 220, 221 of the beam 204 and the base 201. As shear stress 230 is applied to the sensing elements 222, the piezoelectric material forming the sensing elements 222 may be loaded according to Newtonian mechanics, resulting in a change in electric charge or voltage that can be detected and measured.

In one embodiment, the sensing elements 222 may be formed from shear mode piezoelectric material. Shear mode piezoelectric material may be highly sensitive, and may have a larger charge coefficient than some other piezoelectric sensing modes. In some embodiments, the shear mode piezoelectric material may be configured to generate an electric charge that is proportional to the amplitude of the stress forces impacting upon the sensing elements 222. For example, one embodiment may utilize PMN-PT piezoelectric crystal, which has a d15 charge coefficient (approximately 5000 pC/Newton). Another embodiment may utilize piezoresistive material, rather than piezoelectric material. A piezoresistive material may convert shear stress into a change in resistance that is proportional to the shear stress amplitude of the applied force. In such embodiments, an electric conditioner configured to detect this charge or resistance change may be coupled to the sensing elements and may generate a measurable voltage in the range of tens of micro-volts to hundreds of micro-volts. Piezoresistive materials may also have a relatively high shear mode piezoresistance coefficient. For example, a doped Silicon crystal may have a shear mode piezoresistance coefficient $\pi_{44}$ at $138 \times 10^{-11}$/Pa.

Utilizing shear mode piezoelectric elements in connection with the disclosed transducer 200 provides many benefits. For example, the cantilever structure of the transducer 200 may be well-suited for detecting vibrations at low-frequencies, while the shear sensing structure may be well-suited for detecting vibrations at high-frequencies. The disclosed transducer 200 combines the advantages of the shear mode material with the cantilever beam design, and is therefore highly efficient in detecting acoustic or vibration signals in a frequency range suitable for seismic imaging, among other applications. Additionally, the flex shear piezoelectric transducers described herein may have a smaller size than other types of piezoelectric elements, which allows the resulting transducer 200 to be lighter and more compact in design than other types of transducers, while maintaining high sensitivity to a range of vibrations.

Figure 3:
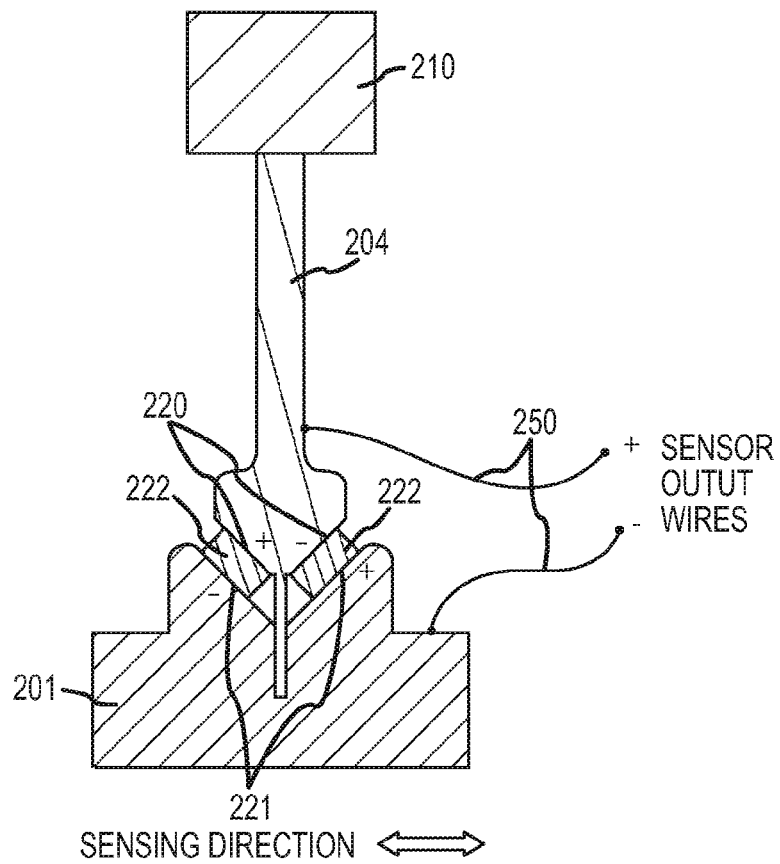
FIG. 3 is a schematic diagram of some of the electrical connections associated with the embodiment of the transducer shown in FIG. 2.

FIG. 3 illustrates a schematic diagram of some of the electrical connections that can be used in connection with the embodiment of the transducer 200 shown in FIG. 2. As is shown, each sensing element 222 may be electrically coupled to the cantilever beam 204 and to the base 201, and the sensing elements 222 may be oriented such that they are of opposing polarity to one another. In some embodiments, the beam 204 and the base structure 201 may each be electrically coupled to a voltage measurement device (not specifically shown) that is configured to measure the voltage provided by the transducer 200 as the proof mass 210 is deflected. In one embodiment, the beam 204 and the base structure 201 may be coupled to the voltage measurement device via one or more output wires 250.

As the proof mass 210 is displaced, the sensing elements 222 may be subjected to shear stress, producing a differential charge in the sensing elements 222 that is proportional to the stress applied. The charge produced may cause a potential difference between the beam 204 and the base structure 201, which can be measured by either a voltage or a charge measurement device. The potential difference may change polarity depending on the direction in which the proof mass 210 is displaced. For example, deflection of the proof mass 210 in one direction may cause a positive potential difference, while deflection of the proof mass 210 in the other direction may cause a negative potential difference.

In the embodiment illustrated in FIG. 3, the beam 204 and the base structure 201 may be formed from an electrically conductive material, such that the charge generated by the sensing elements 222 may flow through the beam 204. For example, the beam may be formed from steel, aluminum, or an alloy formed from multiple types of metal. In embodiments where the beam is formed from a conductive material, the tine 218 may be coated with a non-conductive material in order to prevent a short from the beam 204 to base 201. In other embodiments, the beam 204 and the base structure 201 may be formed from a non-conductive or substantially non-conductive material, such as alumina, ceramic, or plastic. In such embodiments, the output wires 250 may be directly coupled to the sensing elements 222, rather than to the beam 204 or the base structure 201. Alternatively, the base structure 201 and/or beam 204 may be plated with an electrically conductive material to provide electric access to the sensing element 222.

Figure 4:
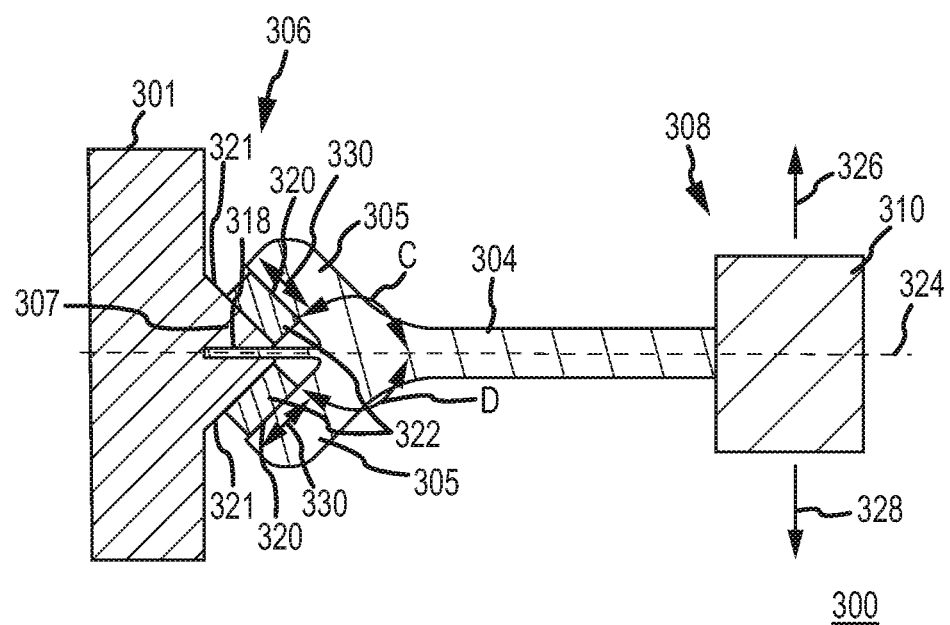
FIG. 4 illustrates a cross-sectional view of another embodiment of a transducer.

FIG. 4 illustrates another embodiment of a transducer 300. Similar to the embodiment shown in FIG. 2, this embodiment may include a cantilever including a beam 304 coupled to a proof mass 310. The beam 304 may also define a tongue 318 that anchors the beam 304 to a base structure 301. In this embodiment, the beam 304 may define a y-shape, where the rear end 308 of the beam 304 may have a linear structure, while the forward end 306 of the beam 304 may define two arms 305 that extend at angles away from one another. The inner surfaces of the arms 305 may each define a coupling surface 320 that is configured to contact one or more sensing elements 322. As is shown, each of the coupling surfaces 320 may define an obtuse angle C, D that is between 90 and 180 degrees relative to the longitudinal axis 324 of the beam 304.

As is shown, the base structure 301 may have a protruded portion 307 that defines two angled coupling surfaces 321 configured to contact the sensing elements 320. Similar to the embodiment shown in FIG. 2, the coupling surfaces 321 may be substantially parallel to the coupling surfaces 320 defined by the beam 304. In some embodiments, the coupling surfaces 321 of base structure 301 may define an angle C, D relative to the longitudinal axis 324 of the beam 304 that is substantially equal to the angle C, D defined by the corresponding coupling surfaces of the beam 304. In other embodiments, the coupling surfaces 321 of the base structure 301 may be non-parallel to the coupling surfaces 320 of the beam 304.

Similar to the embodiment shown in FIG. 2, the transducer 300 shown in FIG. 4 may provide a measurable voltage in response to normal forces impacting on the proof mass 310. This voltage may vary from several mV to hundreds of mV when a piezoelectric material is used for the sensing elements 322, for example, and may depend on the input signal level. As described above with respect to FIG. 2, the tongue 318 and/or the length of the beam 304 may be formed from a flexible material that allows for deflection of the proof mass 310 in response to the normal forces that are applied to the mass 310. As the proof mass 310 is deflected, the sensing elements 322 are subjected to shear stress (represented by arrows 330), and produce a voltage that can be measured by a voltage measuring device (not specifically shown).

In contrast to the embodiment shown in FIG. 2, in which the sensing elements 222 are oriented in a forwardly-slanted direction, the sensing elements 322 of the transducer 300 shown in FIG. 4 are oriented in a rearwardly-slanted direction. The embodiment shown in FIG. 4 nonetheless allows for the generation of shear forces across the sensing elements 322 as the proof mass 310 is displaced due to the angled coupling surfaces 320, 321 to which the sensing elements 322 are mounted.

While the examples of beams 204, 304 illustrated in FIGS. 2 & 4 are of substantially uniform thickness along their length, other embodiments may utilize beams 204, 304 that have varying thickness along their length. As an example, the rear end 208, 308 of the beam 204, 304 may be thinner or thicker than the forward end 208, 308 of the beam 204, 304.

Alternatively, the beam 204, 304 may be notched or include various protrusions along its length.

Additionally, other embodiments may not utilize a proof mass 210, 310 that is joined to the beam 204, 304. In such embodiments, the proof mass 210, 310 may be integral to the beam, rather than a distinct form coupled to the beam. For example, in some embodiments, the beam 204, 304 may have a thicker rear end 208, 308 that functions similar to the proof mass 210, 310 described above with respect to the embodiments shown in FIGS. 2 and 4. In further embodiments, the beam 204, 304, may have a substantially uniform thickness along its length.

Other embodiments may also utilize other configurations of proof masses 210, 310. While FIGS. 2-4 illustrate a rectangular-shaped proof mass 210, 310, other embodiments may utilize proof masses having other configurations. For example, a circular proof mass or a pyramid-shaped mass may be used.

Figure 5:
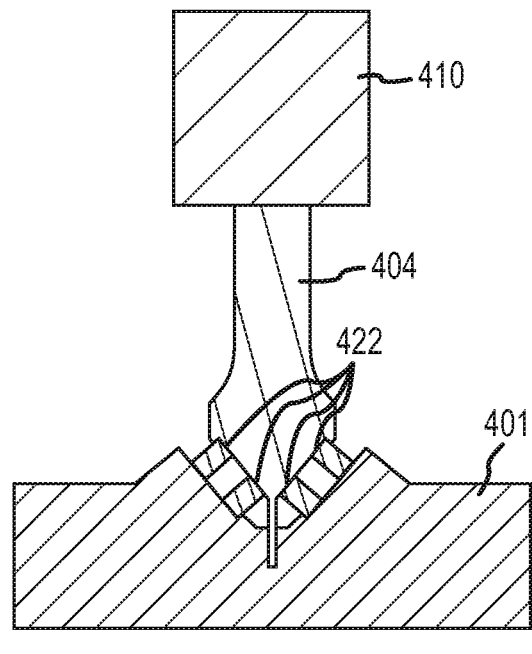
FIG. 5 illustrates a cross-sectional view of another embodiment of a transducer.

FIG. 5 illustrates another embodiment of a transducer 400. While the embodiments shown in FIGS. 2 and 4 illustrate transducers 200, 300 in which a single sensing element 222, 322 is positioned on each side of the beam 204, 304, this embodiment includes multiple sensing elements 422 positioned on opposite sides of the beam 404. For example, one or both sides of the beam 404 may include two or more sensing elements 422 positioned between the beam 404 and the base structure 401. The charge output by each sensing element 422 may be transmitted to a voltage measurement device (not specifically shown), thereby increasing the sensitivity of the transducer 400. In other embodiments, different numbers of sensing elements 422 may be positioned on opposite sides of the beam 404, making the transducer more sensitive to deflection of the proof mass 410 in one direction than the other.

Figure 6:
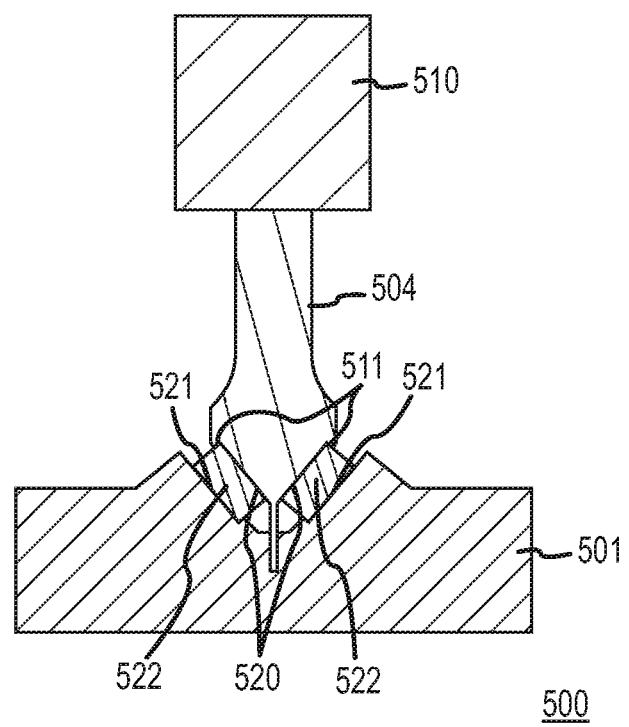
FIG. 6 illustrates a cross-sectional view of another embodiment of a transducer.

FIG. 6 illustrates another embodiment of a transducer 500. This embodiment is similar to the embodiment depicted in FIG. 2, described above. However, in this embodiment, the beam 504 may define one or more notched or stepped portions 511 adjacent the coupling surfaces 520 that help to align the sensing elements 522 with the beam 504 during manufacturing. In some embodiments, the base 501 may also or alternatively include corresponding notched or stepped portions that are configured to catch the ends of the sensing elements 522 to facilitate alignment of the sensing elements 522 with the base 501 during manufacturing.

Figure 7:
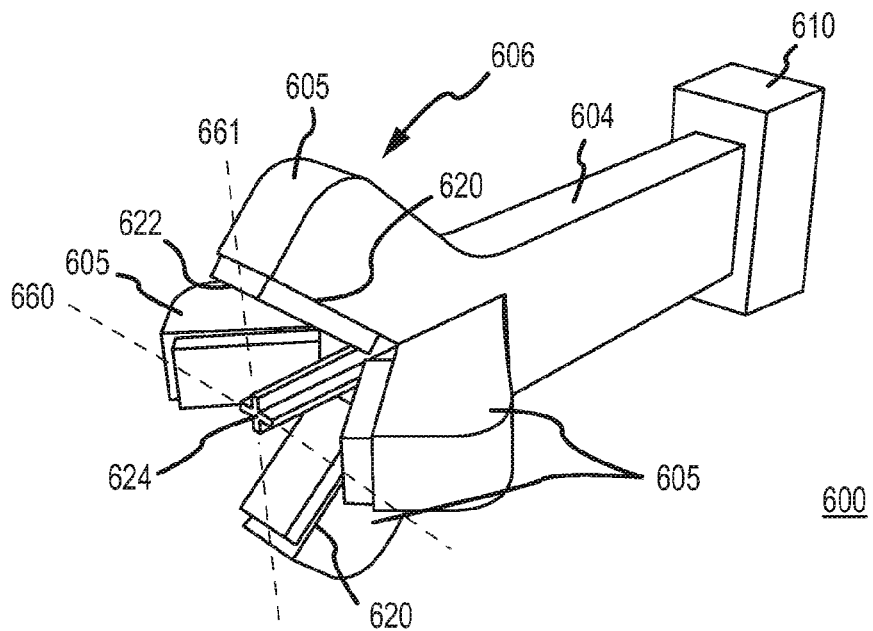
FIG. 7 illustrates a front perspective view of another embodiment of a transducer.

FIG. 7 illustrates another embodiment of a transducer 600, with the base structure removed. In this embodiment, the forward end 606 of the beam may include four arms 605. The arms may be similar in structure as the arms 305 of the beam 304 shown in FIG. 4, wherein each of the arms 605 define an angled coupling surface 620 relative to the longitudinal axis 624 of the beam 604. Similar to other embodiments, the coupling surfaces 620 may each be configured to receive one or more sensing elements 622. This particular embodiment includes two pairs of sensing elements 622 (for a total of four sensing elements 622), with each pair of sensing elements 622 including two sensing elements mounted on opposite sides of the beam from one another. As is shown, the first pair of sensing elements 622 may be positioned along a first axis (represented by dotted line 660), and the second pair of sensing elements 622 may be positioned along a second axis (represented by dotted line 661) that is substantially perpendicular to the first axis 660.

In this embodiment, the transducer 600 may be used as a dual axis accelerometer because it can sense acceleration applied along each of the first and second axes 660, 661. For example, when the proof mass 610 is deflected in a direction along the first axis 660, the sensing elements 622 positioned along the first axis 660 may be subjected to shear stress, resulting in the generation of a measurable voltage across these sensing elements 622. When the proof mass 610 is deflected in a direction along the second axis 661, the sensing elements 622 positioned along the second axis 661 are subjected to shear stress, resulting in the generation of a measurable voltage across these sensing elements 622. Accordingly, the transducer 600 shown in FIG. 7 may be used in measuring external forces applied in multiple directions and across multiple dimensions. The charge generated on the surface(s) of each one or each pair of sensing elements 622 may be separated (e.g., decoupled) in some embodiments, and further may be provided to a voltage measurement device.

Other embodiments may include more or fewer sensing elements 622 that are positioned along other axes of the beam. For example, other embodiments may include three sensing elements 622 that are positioned along axes that are each 120 degrees apart from one another, rather than perpendicular to one another. As another example, some embodiments may include eight sensing elements 622 that are positioned along axes that are 45 degrees apart from one another. The charge generated on the surface(s) of each one or each pair (or other combination) of sensing elements 622 may be separated (e.g., decoupled) in some embodiments, and further may be provided to a voltage measurement device.

Figure 8:
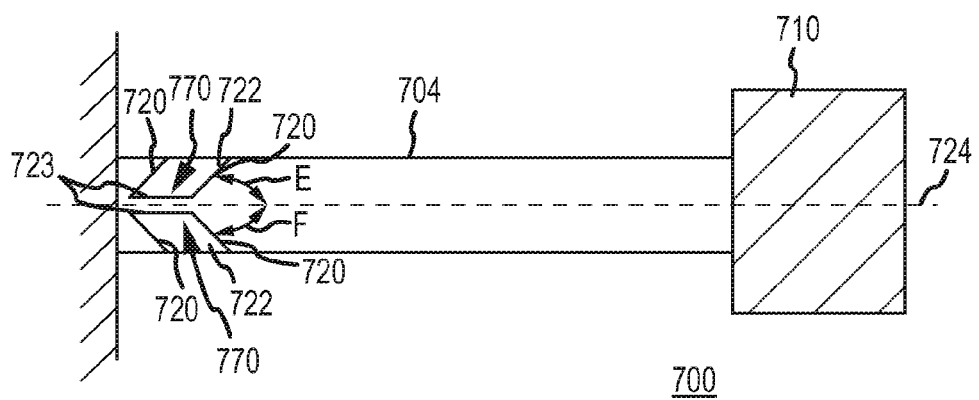
FIG. 8 illustrates a cross-sectional view of another embodiment of a transducer.

FIG. 8 illustrates another embodiment of a transducer 700, in which the sensing elements 722 are embedded into the beam 704. In this embodiment, the beam 704 may define multiple slots 770 or grooves configured to receive one or more sensing elements 722. The slots 770 may include two opposing coupling surfaces 720 that are configured to engage the side faces of a sensing element 722, as well as an end wall 723 configured to engage the end wall of the sensing element 722. In some embodiments, the two opposing coupling surfaces 720 may be bonded to a sensing element received within the slot, but the end walls 723 of the slots 770 may remain unbonded to the corresponding end wall of the sensing element 722. In other embodiments, each of the faces of the sensing element 722 may be bonded to the walls 723, 720 of the slots. As is shown, the opposing coupling surfaces 720 may be substantially parallel to one another, and the end wall 723 may be substantially parallel to wall of the beam 704. In other embodiments, the opposing coupling surfaces 720 may be non-parallel to one another. The charge generated on the surface(s) of each one or each pair (or other combination) of sensing elements 722 may be separated (e.g., decoupled) in some embodiments, and further may be provided to a voltage measurement device.

Similar to other embodiments, the coupling surfaces 720 may extend at angles E, F relative to the longitudinal axis 724 of the beam 704. For example, in one embodiment the coupling surfaces 720 may define an angle E, F relative to the longitudinal axis of the beam that is between 0 and 90 degrees (i.e. an acute angle). In such embodiments, the sensing elements 722 may be positioned in a forward-slanting orientation. In another embodiment, the coupling surfaces may define an angle that is between 90 and 180 degrees (i.e. an obtuse angle) relative to the longitudinal axis of the beam, such that the sensing elements 722 may be positioned in a rear-slanting orientation.

In the embodiment shown in FIG. 8, the slots 770 may be located at the same position along the length of the beam 704. However, in other embodiments, a first slot 770 may be located at one position along the length of the beam 704, while the other slot 770 (located on the opposite side of the beam 704 from the first slot 770) may be located at another position along the length of the beam 704 (e.g., further or closer to the front or rear ends 706, 708 of the beam 704).

Figure 9:
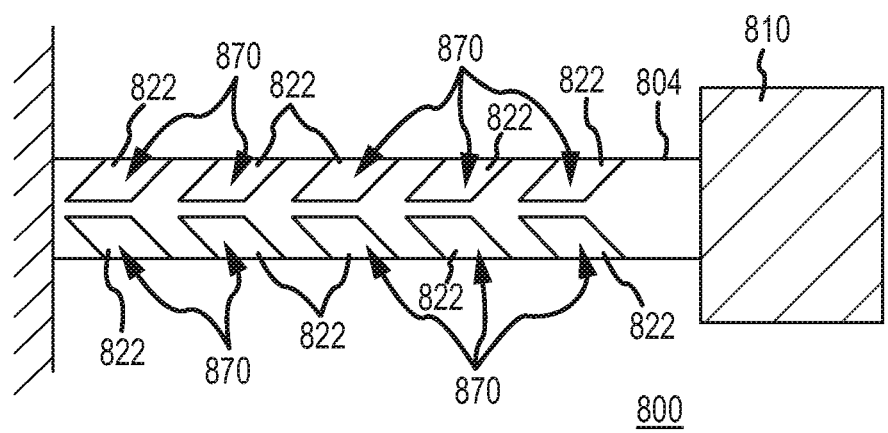
FIG. 9 illustrates a cross-sectional view of another embodiment of a transducer.

FIG. 9 illustrates another embodiment of a transducer 800. This embodiment is very similar to that shown in FIG. 8, but the beam 804 in this embodiment may include multiple pairs of slots 870 or cutouts (as shown in FIG. 8) along the length of the beam 804 that are each configured to receive one or more sensing elements 822. As is shown, the sensing elements 822 located on one side of the beam 804 may be substantially parallel to one another, and the sensing elements 822 located on the other side of the beam 804 may also be substantially parallel to one another. In other embodiments, however, the sensing elements 822 may be oriented such that they are non-parallel to one another.

In some embodiments, each one or each pair of sensing elements 822 may be coupled to a voltage measurement device (not specifically shown) in order to capture and/or measure the charge generated on one or more surfaces of the sensing elements 822. As proof mass 810 is displaced, the beam 804 may be deflected along its length, and each pair of sensing elements 822 may be subjected to different levels of shear stress, based on their position along the length of the beam 804. Accordingly, this transducer 800 may allow for increased sensitivity since multiple voltage readings may be obtained along the length of the beam 804 each time the proof mass 810 is displaced. In some embodiments, sensing elements 822 may be positioned on four sides of the beam 804 in order to have a dual axis response, similar to that described above with reference to FIG. 7.

Figure 10:
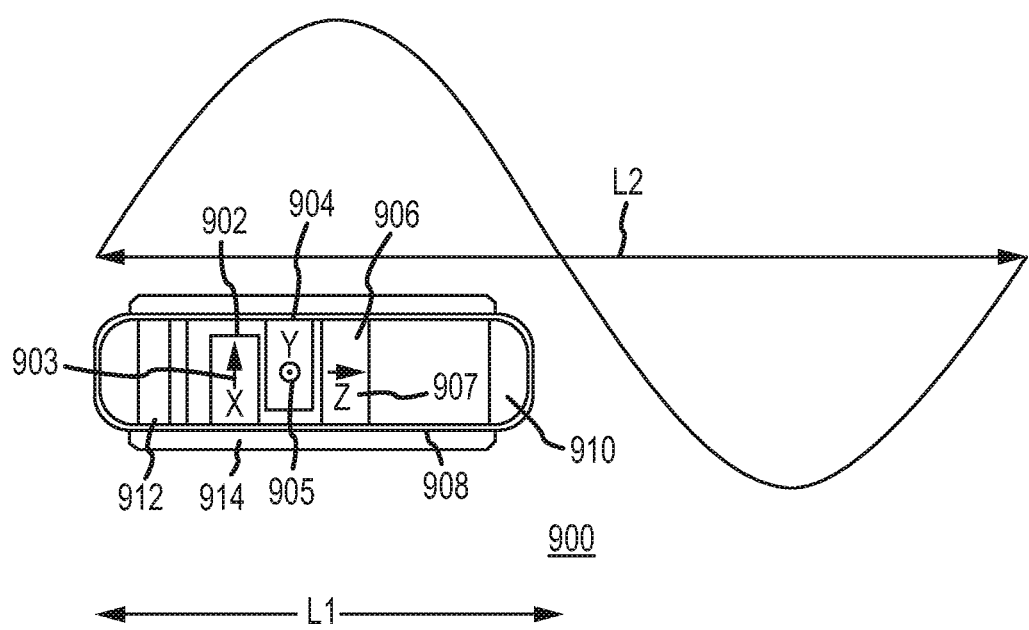
FIG. 10 illustrates a cross-sectional view of one embodiment of a packaged seismic receiver.

FIG. 10 illustrates one embodiment of a packaged seismic receiver 900 that includes multiple transducers 902, 904, 906 that together can be used as a tri-axial accelerometer. The transducers 902, 904, 906 may be similar to those previously described with respect to prior embodiments. As is shown, each of the transducers 902, 904, 906 may be mounted to an enclosed housing 908 that contains all of the transducers 902, 904, 906. Additionally, the receiver 900 may further include other components, such as a hydrophone 910 or other sensing device configured to measure acoustic pressure, as well as an electronic conditioner 912, such as a voltage measurement device or an amplifier that is coupled to transducers 902, 904, 906. In some embodiments, the housing 908 may be fully or partially covered by a foam material 914 or other low-density material that does not add significant weight to the receiver 900. In one embodiment, the foam material 914 may be syntactic foam.

As is shown, the transducers 902, 904, 906 may each be configured to sense acoustic particle acceleration applied in different directions 903, 905, 907. For example, the transducers 902, 904, 906 may be oriented such that they are substantially orthogonal to one another. In one embodiment, the transducers 902, 904, 906 may be oriented substantially orthogonally to one another, such that the transducers 902, 904, 906 may sense acoustic particle acceleration in the X, Y, and Z directions 903, 905, 907, as shown in FIG. 10. In other embodiments, the transducers 902, 904, 906 may be oriented at other angles relative to one another.

In some embodiments, the receiver 900 may include a relatively large amount of void space within the housing to affect its buoyancy. For example, in one particular embodiment, the equivalent density of the receiver 900 may be less than or equal to approximately five (5) times the density of water so that the receiver 900 can follow the acoustic particle velocity. The buoyancy of the receiver 900 may be further increased by the foam 914 surrounding the housing 908. Additionally, as shown, the receiver 900 may have a length L1 that is less than or equal to approximately half of the wavelength L2 of the upper bound frequency of an acoustic wave.

During operation, the receiver 900 may be displaced by acoustic waves moving through the water, such that the receiver 900 follows the movement of the acoustic waves. The transducers 902, 904, 906 may each be configured to sense the amount of acoustic acceleration (i.e., velocity) of the receiver 900 as it moves in the water in one directional component 903, 905, or 907 (e.g., X, Y, or Z). Other embodiments may include more or fewer transducers such that the receiver 900 may be capable of sensing acoustic acceleration in more or fewer directions.

Figure 11:
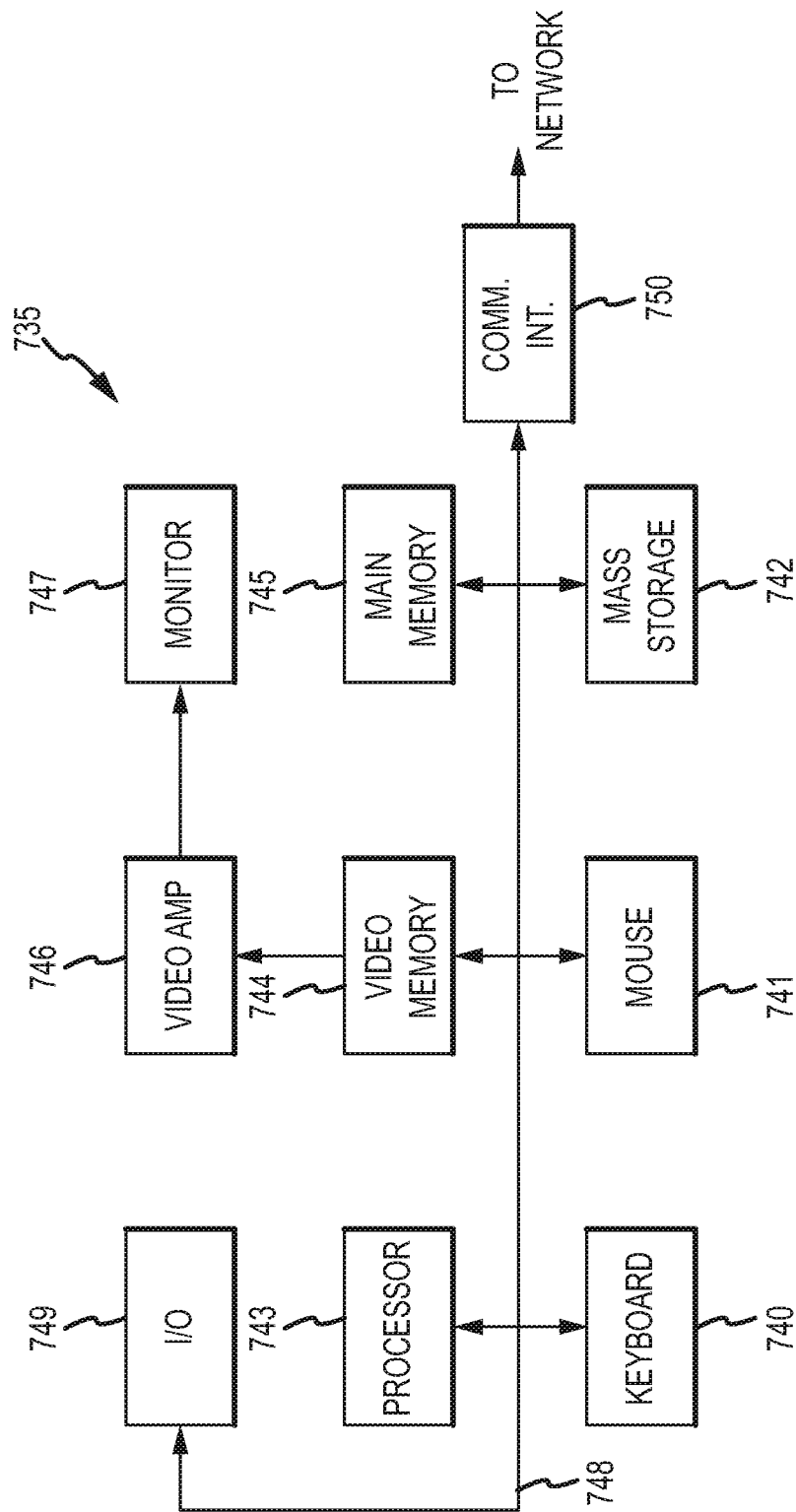
FIG. 11 illustrates an embodiment of a computer system capable of storing and/or processing navigation and seismic data received from one or more transducers, such as to determine the acoustic acceleration of a body in at least one directional component.

FIG. 11 illustrates an embodiment of a computer system 735 capable of processing the data from one or more transducers or receivers to determine the acoustic acceleration of a body in at least one directional component. The transducer(s) may be similar to any of the embodiments described above and shown in FIGS. 2-9. In some embodiments, the computer system 735 may be a personal computer and/or a handheld electronic device aboard the vessel 101 (shown in FIG. 1). In other embodiments, the computer system 735 may be an implementation of enterprise level computers, such as one or more blade-type servers within an enterprise in a land-based computer system. A keyboard 740 and mouse 741 may be coupled to the computer system 735 via a system bus 748. The keyboard 740 and the mouse 741, in one example, may introduce user input to the computer system 735 and communicate that user input to a processor 743. Other suitable input devices may be used in addition to, or in place of, the mouse 741 and the keyboard 740. An input/output unit 749 (I/O) coupled to the system bus 748 represents such I/O elements as a printer, audio/video (A/V) I/O, etc.

Computer 735 also may include a video memory 744, a main memory 745 and a mass storage 742, all coupled to the system bus 748 along with the keyboard 740, the mouse 741 and the processor 743. The mass storage 742 may include both fixed and removable media, such as magnetic, optical or magnetic optical storage systems and any other available mass storage technology. The bus 748 may contain, for example, address lines for addressing the video memory 744 or the main memory 745.

The system bus 748 also may include a data bus for transferring data between and among the components, such as the processor 743, the main memory 745, the video memory 744 and the mass storage 742. The video memory 744 may be a dual-ported video random access memory. One port of the video memory 744, in one example, is coupled to a video amplifier 746, which is used to drive a monitor 747. The monitor 747 may be any type of monitor suitable for displaying graphic images, such as a cathode ray tube monitor (CRT), flat panel, or liquid crystal display (LCD) monitor or any other suitable data presentation device.

The computer system includes a processor 743, which may be any suitable microprocessor or microcomputer. The computer system 735 also may include a communication interface 750 coupled to the bus 748. The communication interface 750 provides a two-way data communication coupling via a network link. For example, the communication interface 750 may be a satellite link, a local area network (LAN) card, a cable modem, and/or wireless interface. In any such implementation, the communication interface 750 sends and receives electrical, electromagnetic or optical signals that carry digital data streams representing various types of information.

Code received by the computer system 735 may be executed by the processor 743 as the code is received, and/or stored in the mass storage 742, or other non-volatile storage for later execution. In this manner, the computer system 735 may obtain program code in a variety of forms. Program code may be embodied in any form of computer program product such as a medium configured to store or transport computer readable code or data, or in which computer readable code or data may be embedded. Examples of computer program products include CD-ROM discs, ROM cards, floppy disks, magnetic tapes, computer hard drives, servers on a network, and solid state memory devices. Regardless of the actual implementation of the computer system 735, the data processing system may execute operations that allow for the filtering using repeatability and other metrics.

While the embodiments described above are primarily described in connection with detecting seismic energy, a person of skill in the art will appreciate that these embodiments may also be used for other purposes. For example, the disclosed transducers may be used to measure vehicle acceleration, vibration on cars, machines, buildings, process control systems, safety installations, and so on. Additionally, the disclosed transducers may be used in smartphones, digital audio players, and other electronic devices utilizing transducers to determine the orientation of the device relative to the user. A person of skill in the art will further appreciate that the disclosed transducers may have a multitude of applications associated with other types of transducers, including, but not limited to, applications in engineering, biology, industry, medicine, transportation, navigation, and gravimetry. Furthermore, a person of skill in the art will appreciate that as described above, the transducers described herein may be used as sensors, but they may also or alternatively be used as actuators where a voltage is applied to the piezoelectric sensing material and the beam moves as a result of the applied voltage.

The apparatuses and associated methods in accordance with the present disclosure have been described with reference to particular embodiments thereof in order to illustrate the principles of operation. The above description is thus by way of illustration and not by way of limitation. Various modifications and alterations to the described embodiments will be apparent to those skilled in the art in view of the teachings herein. Those skilled in the art may, for example, be able to devise numerous systems, arrangements and methods which, although not explicitly shown or described herein, embody the principles described and are thus within the spirit and scope of this disclosure.

Accordingly, it is intended that all such alterations, variations, and modifications of the disclosed embodiments are within the scope of this disclosure as defined by the appended claims.

In methodologies directly or indirectly set forth herein, various steps and operations are described in one possible order of operation, but those skilled in the art will recognize that the steps and operations may be rearranged, replaced, or eliminated without necessarily departing from the spirit and scope of the disclosed embodiments.

All relative and directional references (including: upper, lower, upward, downward, upgoing, downgoing, left, right, top, bottom, side, above, below, front, middle, back, vertical, horizontal, middle, and so forth) are given by way of example to aid the reader's understanding of the particular embodiments described herein. They should not be read to be requirements or limitations, particularly as to the position, orientation, or use of the invention. Connection references (e.g., attached, coupled, connected, joined, and the like) are to be construed broadly and may include intermediate members between a connection of elements and relative movement between elements. As such, connection references do not necessarily infer that two elements are directly connected and in fixed relation to each other, unless specifically set forth in the claims.

What is claimed is:

1. A transducer, comprising:
   a cantilever coupled to a base, the cantilever comprising a beam and a first coupling surface angularly oriented from the beam and defined by a forward end of the cantilever, and the base comprising a second coupling surface angularly oriented from the beam and substantially parallel to the first coupling surface of the cantilever;
   a sensing material coupled between the first coupling surface of the cantilever and the second coupling surface of the base; and
   a tine that couples the cantilever to the base, wherein the tine is configured to reduce the cross-axis sensitivity of the transducer and to enhance sheer stress applied to the sensing material;
   wherein one or both of the first or second coupling surfaces defines an acute or obtuse angle with respect to a longitudinal axis of the beam.

2. The transducer of claim 1, wherein the sensing material comprises first and second surfaces and the sensing material is configured to operate in a shear mode.

3. The transducer of claim 2, wherein the first surface of the sensing material is in contact with the first coupling surface of the cantilever and the second surface of the sensing material is in contact with the second coupling surface of the base.

4. The transducer of claim 1, wherein the sensing material has a rectangular cross-section.

5. The transducer of claim 1, wherein the cantilever comprises the tine and the tine extends into a void in the base.

6. The transducer of claim 1, wherein the base comprises the tine and the tine extends into a void in the cantilever.

7. The transducer of claim 1, further comprising a proof mass.

8. The transducer of claim 1, wherein the sensing material comprises a piezoelectric or piezoresistive element.

9. The transducer of claim 1, wherein the cantilever, the base, and the sensing material together form a first accelerometer, further comprising a second accelerometer and a third accelerometer, the first, second, and third accelerometers mounted in a housing and together forming a vector sensor.

10. A transducer, comprising:
    a cantilever coupled to a base, the cantilever comprising a beam; and
    a sensing material embedded within the beam of the cantilever,
    wherein the sensing material comprises a first piezoelectric element having first and second surfaces that are angularly oriented from the beam; and
    wherein the transducer comprises a second piezoelectric element having third and fourth surfaces that are angularly oriented from the beam, and the transducer also comprises third and fourth piezoelectric elements embedded within the beam, the third piezoelectric element oriented parallel to the first piezoelectric element and the fourth piezoelectric element oriented parallel to the second piezoelectric element.

11. The transducer of claim 10, wherein the sensing material comprises a piezoelectric shear mode element, and the sensing material has a parallelogram cross-section.

12. The transducer of claim 10, wherein the cantilever is coupled to the base at a first end of the cantilever and further comprising a proof mass coupled to a second end of the cantilever.

13. The transducer of claim 10, wherein the cantilever is coupled to the base at a first end of the cantilever and the sensing material is embedded in the cantilever near the first end of the cantilever.

14. The transducer of claim 10, wherein the beam comprises a groove having a first inner wall, a second inner wall, and a third inner wall, the third inner wall substantially parallel to the first inner wall, and the sensing material embedded within the groove, further wherein the sensing material is bonded to the first and third inner walls, but not the second inner wall.

15. A method comprising the acts of:
acquiring data from a transducer coupled to a body, the transducer comprising:
a cantilever coupled to a base and comprising a beam defining at least one coupling surface that is acutely or obtusely angularly oriented with respect to a longitudinal axis of the beam;
at least one sensing element comprising a sensing material coupled to the at least one coupling surface, wherein the sensing element is subjected to shear stress as the beam is deflected relative to the base; and
a tine that couples the cantilever to the base, wherein the tine is configured to reduce the cross-axis sensitivity of the transducer and to enhance shear stress in the sensing material.

16. A method comprising the acts of:
acquiring data from a transducer coupled to a body, the transducer comprising: a cantilever coupled to a base and comprising a beam defining at least one coupling surface; and
at least one sensing element comprising a sensing material coupled to the at least one coupling surface, wherein the sensing element is a shear mode piezoelectric element; and
a tine that couples the cantilever to the base, wherein the tine is configured to reduce the cross-axis sensitivity of the transducer and to enhance shear stress in the sensing material.

17. The method of claim 16, further comprising the act of processing the data from the transducer to determine acoustic acceleration of the body in at least one directional component.

* * * * *